Figure 1:
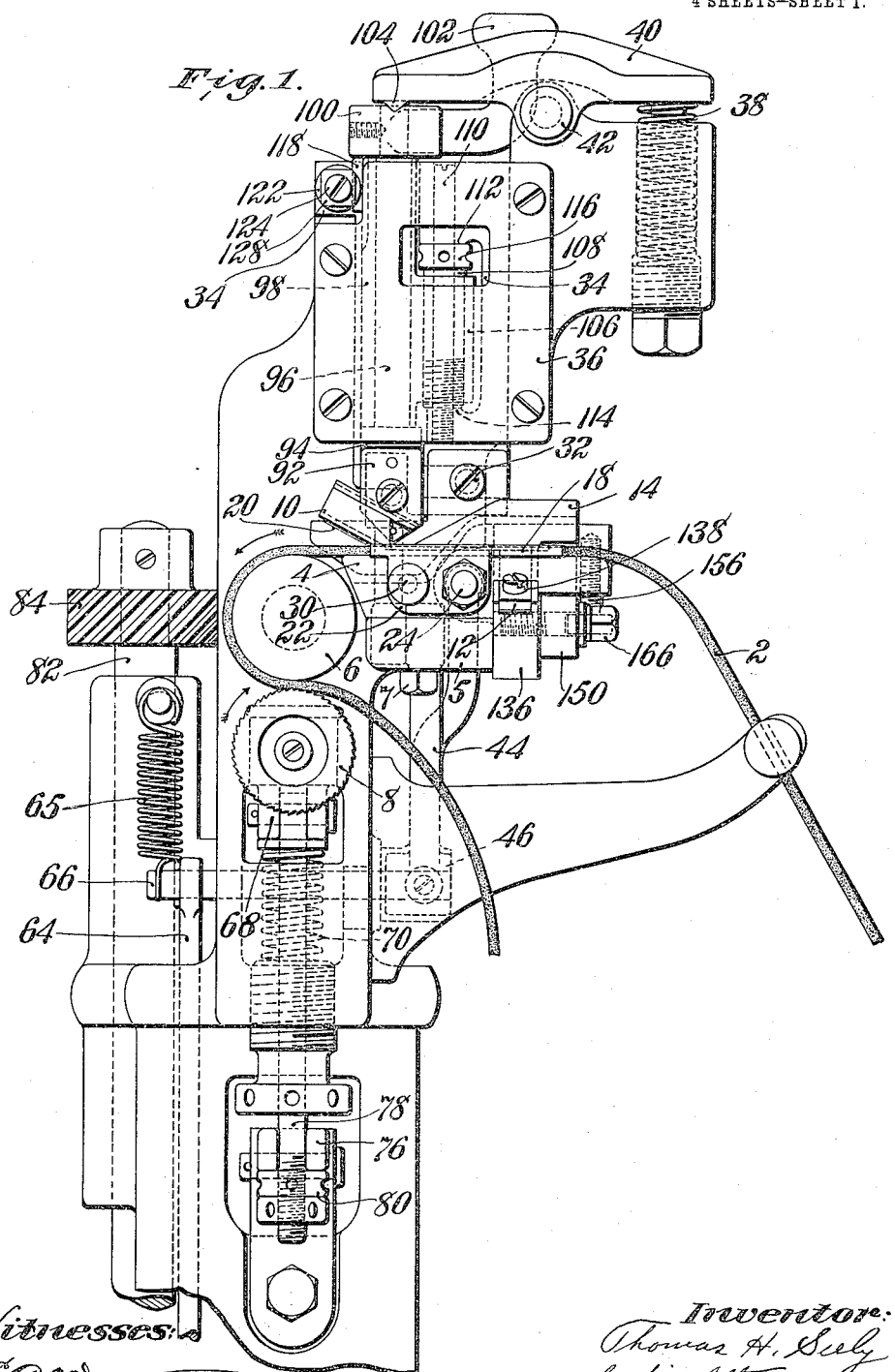

T. H. SEELY.
MACHINE FOR PREPARING WELTS.
APPLICATION FILED DEC. 16, 1911.

1,127,376.

Patented Feb. 2, 1915.
4 SHEETS—SHEET 1.

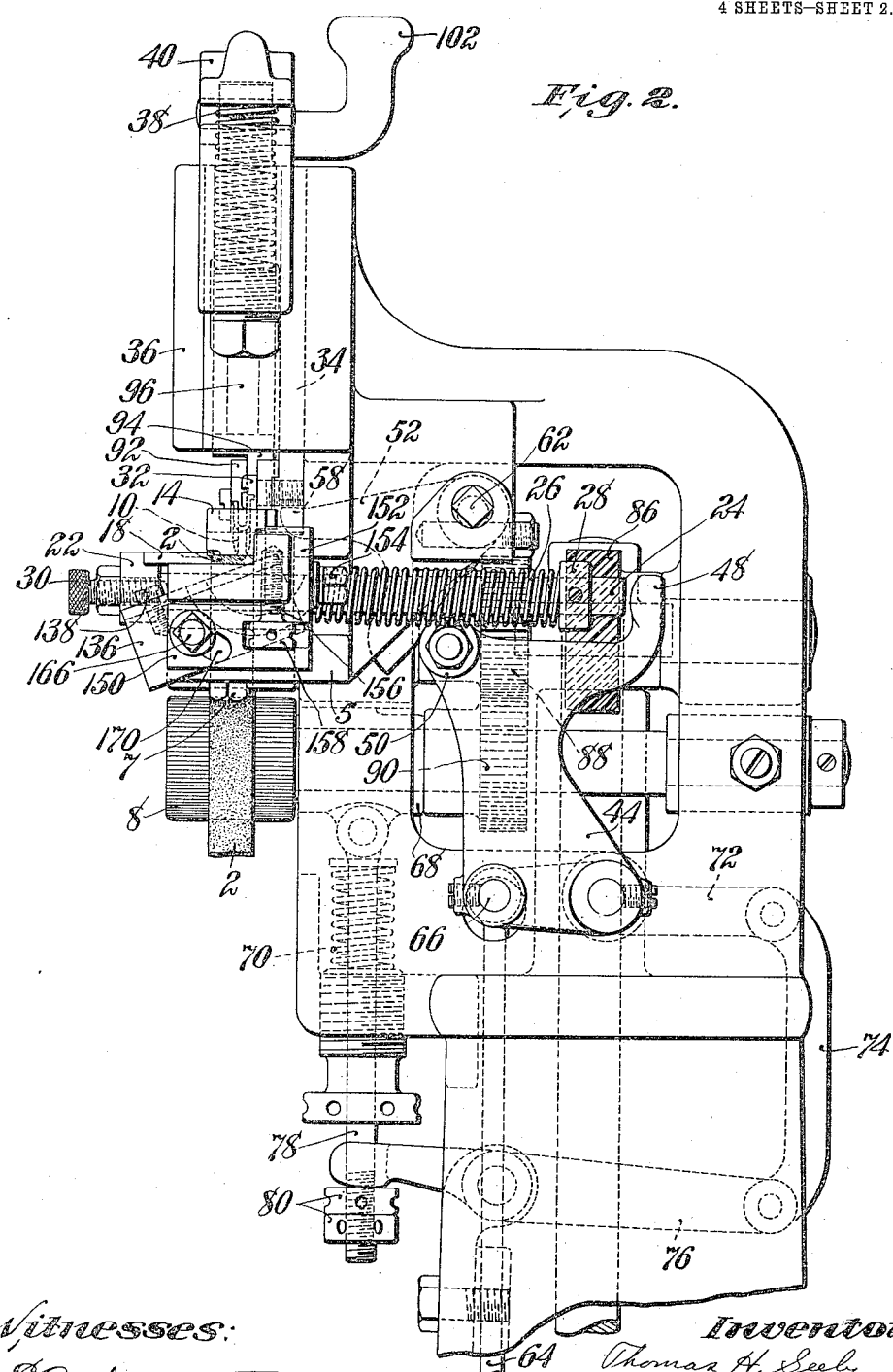

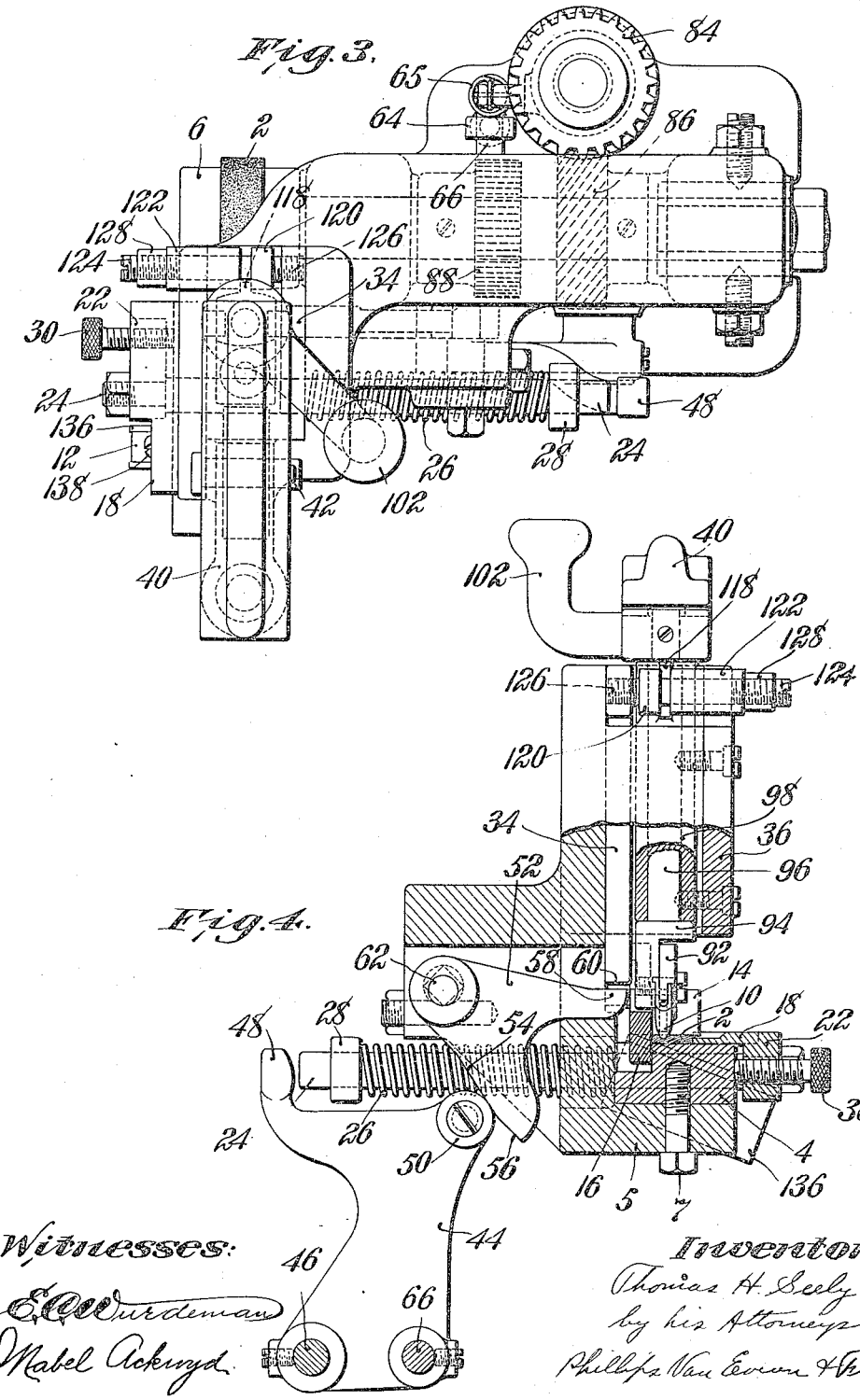

T. H. SEELY.
MACHINE FOR PREPARING WELTS.
APPLICATION FILED DEC. 16, 1911.
1,127,376.
Patented Feb. 2, 1915.
4 SHEETS—SHEET 4.
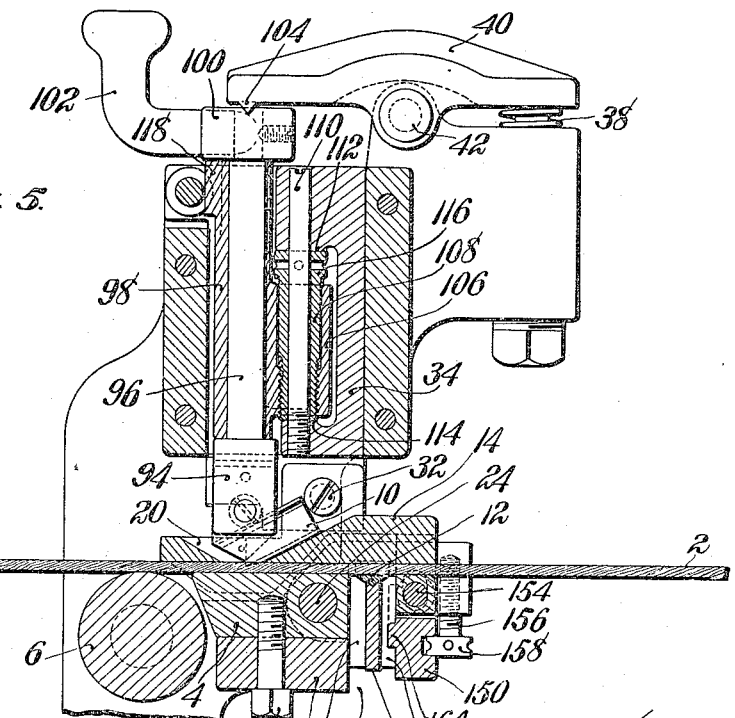
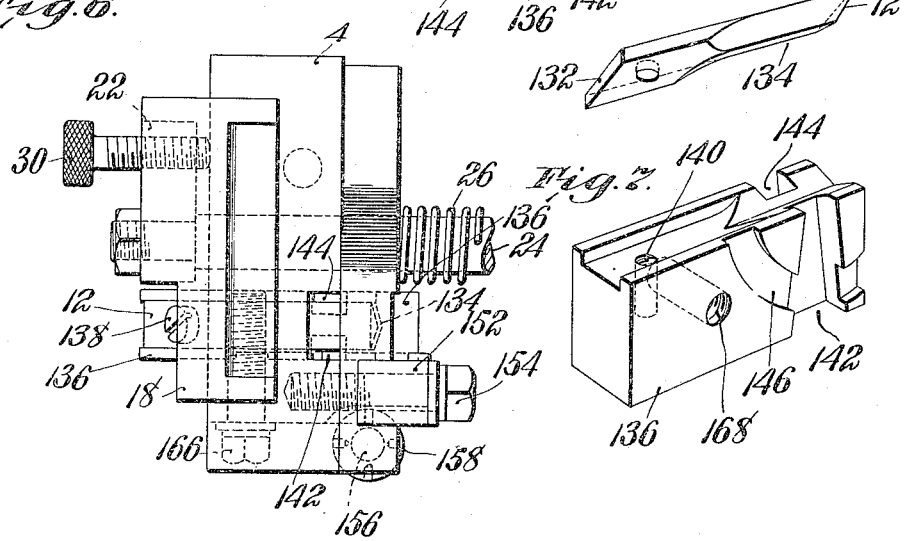
Witnesses:
Inventor:
Thomas H. Seely
by his Attorneys
Phillips Van Everen & Fish

UNITED STATES PATENT OFFICE.

THOMAS H. SEELY, OF DORCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR PREPARING WELTS.

1,127,376.  Specification of Letters Patent.  Patented Feb. 2, 1915.

Application filed December 16, 1911. Serial No. 666,134.

*To all whom it may concern:*

Be it known that I, THOMAS H. SEELY, a citizen of the United States, residing at Dorchester, in the county of Suffolk and State of Massachusetts, have invented certain new and useful Improvements in Machines for Preparing Welts; and I do hereby declare the following to be a full, clear, and exact description of the invention, such as will enable others skilled in the art to which it appertains to make and use the same.

The present invention relates to machines for preparing welts.

The welt, as supplied to the shoe manufacturer, usually comes in a rolled strip which has both of its surfaces plain and its edges cut square. To prepare the welt strip for use in the sewing machines which attach the welt to the lasted upper and insole, it is usual to pass the welt strip through a welt preparing machine in which knives are arranged to cut a groove in the surface of the welt strip to receive the line of stitches which attaches the welt to the lasted insole and upper and to bevel one edge of the welt strip so that it lies more smoothly against the upper when it is sewn in place. In power driven machines for preparing welts, a feed roll is usually placed beyond the grooving and beveling knives for pulling the welt past the knives. In hand machines, the welt is seized by the operator and pulled past the knives. This necessitates, in either case, that when a fresh roll of welt is to be prepared, a sufficient amount of welt varying from a few inches to a foot must be left in front of the knives for the feed roll to act upon or for the hand to seize so that the remainder of the welt strip may be pulled past the knives. If the welt is inserted endwise into the machine, the knives must be held out of contact with the welt until a sufficient amount of welt is slipped through the machine to be grasped to pull the welt by the knives when they are brought into cutting engagement with the welt. If the welt is slipped sidewise into the machine, as is done in the machines known to the trade as the Goodyear welt grooving and beveling machines, the extreme end of the welt cannot be placed under the knives, but a length must be left sufficient to be grasped to pull the rest of the welt strip past the knives. The result is that, in welt preparing machines as hitherto constructed, a length of welt on the forward end of every roll of welt strip is not cut by the grooving and beveling knives, so that there is a waste of a number of inches of welting on every roll which is prepared by the machine.

One object of the present invention is to produce a welt preparing machine in which it is possible to prepare the entire length of the welt strip and thus save the forward end of the welt strip which has hitherto been wasted.

With the above object in view, the welt cutting knives are arranged to cut the welt strip when the welt strip is passed through the machine in either direction. In preparing the welt strip, the forward end of the welt strip is first inserted in the machine and then drawn backward to prepare the length which has been hitherto wasted, and then the welt strip is re-inserted in the machine and the prepared end of the strip used to be grasped by the means which pulls the welt strip past the knives.

In addition to the feature of invention above referred to, the present invention also consists of certain devices, combinations and arrangements of parts, particularly improvements in the construction of the knife carriers and the welt positioning gages, hereinafter described and claimed, the advantages of which will be obvious to those skilled in the art from the following description.

Referring to the drawings which illustrate the preferred embodiment of the present invention;—Figure 1 is a front elevation of the head of the welt preparing machine; Fig. 2 is an elevation of the right hand side of the head of the machine; Fig. 3 is a plan view of the head of the machine; Fig. 4 is a detail view showing the means for disengaging the presser foot and side gage from the welt; Fig. 5 is a vertical section through the welt, the work table and the presser foot carrier; Fig. 6 is a plan view of the work table; Fig. 7 is a perspective view of the beveling knife carrier; and Fig. 8 is a perspective view of the beveling knife.

The preferred embodiment illustrated in the drawings is described as follows: The welt strip 2 which is to be prepared is drawn over a work table 4 by means of the two feed rolls 6 and 8. The work table 4 is secured to a bracket 5 on the machine frame by means of the bolt 7. The means which coöperate with the welt supporting table to guide the welt strip past the grooving knife 10 and the beveling knife 12 comprise a presser foot 14, a rear side gage 16 which is formed on the presser foot and which is fixed in position laterally of the welt strip, and a front side gage 18 which is adapted to bear loosely against the front edge of the welt and is adjustable laterally of the welt strip. The presser foot 14 consists of a plate of about the same length as the work table, the right hand end of which holds the welt against the beveling knife 12, and the left hand end of which is provided with a notch 20 cut in from its front face and extending over the top of the welt. This notch is of a V-shape, the wide part of the notch opening upward and the narrow part of the notch opening onto the top of the welt. This notch is provided for the grooving knife 10 to extend through. The fixed side gage 16 is formed by a downwardly projecting flange at the back of the presser foot which acts as the supporting connection for the part of the presser foot which lies to the left of the groove 20. The movable side gage 18 consists of a flat plate arranged to slide laterally over the front of the top surface of the work table. The side gage plate 18 is secured to the upper edge of an adjustable block 22. The block 22 is mounted on the forward end of a plunger 24 which is mounted to slide through the work table. A helical spring 26 encircles the rear end of the plunger 24 between a collar 28 and the back of the work table and tends to draw the side gage 18 against the edge of the welt. An adjusting screw 30 is threaded in the block 22 to engage the front of the work table and acts as an adjustable stop for the side gage so that the position of the side gage 18 can be adjusted laterally of the welt. It is to be noted that the movement of the side gage 18 against the welt is limited by the screw 30 so that the side gage may be adjusted to bear loosely against the welt and have no tendency to compress the welt sidewise and cause the welt to buckle transversely.

The presser foot 14 is secured by means of a clamping screw 32 to a sliding carrier 34 which is received in a vertically extending groove in the machine frame and is held in place by the plate 36. A helical spring 38 presses upward on a yoke 40 pivoted at 42 to the head of the machine, which in turn presses down against the knife carrier which is mounted in the presser foot, as will be hereinafter described. The spring 38 therefore tends to hold the presser foot against the upper surface of the welt strip. Manually operable means are provided for removing the side gage 18 and the presser foot 14 relatively to the work table to permit the insertion or removal of a welt strip. Since the space in front of the presser foot 14 and above the side gage 18 is unobstructed when the side gage 18 is drawn forward and the presser foot is lifted, a clear space is left for the welt strip to be slipped from the front of the machine and sidewise of itself under the presser foot 14 and laid on the work table 4. The means for removing the side gage and presser foot relatively to the work table comprise a lever 44 pivoted at 46 to the machine frame and bearing a striker 48 adapted to contact with the rear end of the side gage plunger 24, and a cam roll 50 adapted to bear against a cam face formed on a bell crank lever 52 which in turn acts to raise the presser foot. The cam surface on the lever 52 is formed with a rise 54 and a dwell 56 arranged so that when the cam roll 50 is moved downwardly to the right, as viewed in Fig. 4, it first acts to raise the lever 52. After the roll 50 has passed over the rise 54, it runs on to the dwell 56 so that the presser foot is held up but is given no further upward movement. The motion of the cam lever 52 is transmitted to the presser foot through the arm 58 which contacts under a stop shoulder 60 on the presser foot carrier. The lever 52 is pivoted to the frame at 62 and an eccentric adjustment is provided so that the lever 52 may be moved in position relatively to the cam roll 50 and the stop shoulder 60 so that the presser foot can be lifted more or less. The timing of the cam is such that the cam roll 50 is about to pass onto the dwell 56 when the striker 48 is brought into contact with the rear end of the plunger 24. The result is that the presser foot 14 is lifted before the side gage 18 is moved, and when the lever 44 is allowed to move to the left, as viewed in Fig. 4, and the springs 26 and 38 bring the side gage 18 and presser foot 14 into engagement with a welt strip, the side gage 18 is brought against the welt strip before the presser foot so that the welt strip is positioned laterally on the work table before the presser foot is brought against it. The welt is thus positioned beneath the grooving knife before the presser foot and grooving knife come down against the work to press the welt against the work table. The grooving knife 10 therefore begins to make its cut in the correct position laterally of the welt. Since the stop screw 30 limits the movement of the gage 18 over the welt table, there will be no tendency for the welt to buckle transversely so that there is no necessity for the presser foot to be brought into engagement with the welt before the welt is positioned between the back side gage 16 and the front side gage 18.

The lever 44 is arranged to be actuated to disengage the side gage and presser foot at the will of the operator by means of a rod 64 which is connected at 66 to the lever 44 and runs to a treadle at the base of the machine. The rod 64 is normally held elevated by means of a spring 65. The rod 64 also acts to separate the lower feed roll 8 from the upper feed roll 6 at the same time that the side gage 18 and the presser foot 14 are disengaged from the welt strip. The lower feed roll 8 is mounted in a vertically sliding box 68 and is normally pressed into engagement with the upper feed roll by means of the spring 70. The connections by means of which the depression of the rod 64 lowers the feed roll 8 comprise a lever 72, a link 74, a lever 76 and a rod 78 depending from the journal box 68 and bearing adjustable nuts 80. The arrangement of the treadle and connections for separating the feed rolls are substantially the same as that disclosed in the patent to Charles P. Stanbon for a welt preparing machine, No. 966,484, granted August 9, 1910.

The feed rolls 6 and 8 are driven in the direction indicated by the arrows by means of a vertical driving shaft 82 which bears a spiral gear 84 which meshes with a spiral gear 86 on the shaft which drives the upper feed roll 6. The shaft which drives the lower feed roll 8 carries a gear wheel 90 which meshes with a gear wheel 88 on the shaft of the upper feed roll, the arrangement of parts being similar to that of the above mentioned Stanbon patent.

The grooving knife 10 is carried by the presser foot carrier so that it is raised and lowered with the presser foot. The knife 10 is a U-shaped knife clamped by means of a plate 92 to a head 94 on the lower end of a knife carrying shaft 96. The knife 10 is inclined at an angle of about 30° to the surface of the welt. The knife carrier 96 is journaled in a frame 98. A head 100 is secured to the upper end of the journaled carrier 96 and allows the carrier 96 to turn but not to slide in the frame 98. A handle 102 is provided on the head 100 to turn the knife carrier 96. A groove is formed across the top of the head 100 and receives a rib 104 on the end of the spring pressed yoke piece 40. The groove and rib act to hold the knife and knife carrier in two positions 180° apart. The pressure of the yoke piece 40 against the head 100 is transmitted through the frame 98 to the presser foot carrier 34 and acts to hold the presser foot against the surface of the work. The frame 98 is provided with a lateral projection 106 which is bored vertically and screw-threaded to receive a sleeve 108. The sleeve 108 is fitted in a recess in the presser foot carrier 34 between shoulders 112 and 114 and is held by means of a stud 110 which extends vertically through the carrier 34 so that it can turn but cannot slide relatively to the presser foot carrier. The sleeve 108 is provided with a capstan head 116 whereby the sleeve 108 can be turned and the position of the grooving knife 10 be adjusted relatively to the presser foot 14 so that the knife can be made to groove the welt to the depth desired. Means are provided for turning the frame 98 about the axis of the pin 110 as a pivot to adjust the position of the grooving knife 10 laterally of the welt strip. This adjusting means comprises a laterally extending fin 118 on the upper part of the side of the frame 98 and two adjusting nuts 120 and 122 mounted on a screw 124, which is screwed at 126 into the presser foot carrier 34. The turning of the nuts 120 and 122 along the screw 124 swings the frame 98 about the axis of the pin 110 and so adjusts the knife 10 relatively to the back gage 16 and hence laterally of the welt. A lock nut 128 is provided to clamp the adjusting nut 122 in place and thus lock the adjustment. In adjusting the knife 10 relatively to the presser foot, the nuts 120 and 122 are loosened so that the fin 118 can move up and down. Then the capstan head 116 is turned to give the vertical adjustment to the grooving knife, after which the nuts 120 and 122 are adjusted to give the lateral adjustment to the grooving knife. Then the lock nut 128 is turned in place, thus holding the fin 118 in clamped position between the nuts 120 and 122 so that the frame 98 can neither move vertically nor laterally.

The knife 12 which bevels the edge of the welt is shown in Fig. 8. This knife has a square shank portion 132 and a triangular blade portion 134. The sharp edges of the triangular portion 134 form two oppositely directed cutting knives for beveling the edge of the welt. The beveling knife is mounted in a knife carrier block 136 and is clamped in place by a screw 138 passing through a hole in the knife and threaded at 140 in the block 136. Slots 142 and 144 are formed across opposite faces of the knife carrier 136 to provide downwardly extending passages through which the material cut from the welt strip by the beveling knife may fall. The knife carrier 136 is held in a slot 148 cut in the forward edge of the right hand end of the work table and extending back beyond the position of the welt. The work table 4 and the bracket 5 of the machine frame form the left side of this slot, while the right side of the slot is formed in part by the work table 4 and in part by an L-shaped block 150. The L-shaped block 150 has an upwardly extending portion 152 which is splined into the rear side of the work support and is clamped thereto by a bolt 154. A screw 156 screw-threaded in the work table and having a capstan head 158 fitted into a recess in the side of the block 150 affords provision for adjusting the block vertically with relation to the work table. The block 150 also has a circular rib 164 which engages in a slot 146 of the knife carrier 136. The rib 164 and coöperating slot 146 are struck about a point at the rear edge of the welt as a center so that when the knife carrier 136 is turned, the angle of the bevel is changed, but the depth to which the bevel is cut is unchanged. A clamping screw 166 screw-threaded at 168 in the knife carrier 136 and passing through a curved slot 170 in the block 150 clamps the knife carrier 136 in adjusted angular position. The adjustment of the screw 156 raises or lowers the block 150 together with the knife carrier 136 and beveling knife 12 so that the depth to which the bevel is cut may be varied.

The operation of the machine is as follows: With the grooving knife in the position illustrated in Fig. 5, the rod 64 is depressed by means of the treadle and the side gage 18 and presser foot 14 are moved so that the welt strip can be slipped sidewise into the front of the machine and onto the work table. The end of the roll of welting is thus slipped in, leaving several inches or a foot or more of welt projecting to the left of the machine. Then the operator grasps the welt strip at the right of the machine and pulls the welt backward out of the machine. The grooving knife 10 acts to cut a groove in the top of the welt and the left hand edge of the beveling knife 12 acts to bevel the edge of the welt when the welt is pulled backward. Then the handle 102 is grasped and the grooving knife 10 turned to the position illustrated in Fig. 1, after which the rod 64 is again depressed by means of the treadle and the end of the welt strip is again inserted into the machine from the front. The portion of the welt which has been grooved and beveled lies on the work table and a sufficient length of welt extends to the left of the work table so that it can be grasped between the feed rolls 6 and 8. Then the treadle is released allowing the side gage 18 to first position the welt on the work table and then the presser foot 14 to come down and hold the work against the work table. The feed rolls are then started and the welt strip is pulled through the machine. The amount of welt which is grooved and beveled by being drawn backward through the machine will depend upon the choice of the operator. The operator can bevel a sufficient length of welt to extend from the work table to the feed roll and once or twice around the winding reel, in which case after the welt is re-inserted in the machine, nothing further need be done. Or the operator can bevel off a few inches of welt sufficient to extend from the work table between the feed rolls and then after starting the machine wind the end of the welt around the winding reel. By the use of the present invention, from several inches to a foot of welt can be saved on every roll of welting which is run through the grooving and beveling machine. While the grooving knife is shown as a knife having a single cutting edge and made reversible, and the beveling knife is shown as a single knife having two cutting edges, other forms or arrangements of knives may be used within the purview of the invention as defined in the claims.

While the preferred embodiment of the invention has been specifically illustrated and described, it is nevertheless to be understood that the present invention may be embodied in other forms of construction within the spirit of the invention and the scope of the following claims:—

1. A machine for preparing welts having, in combination, means for supporting and guiding a welt strip, a grooving knife arranged to cut a groove in the surface of the welt strip, and means for reversing the position of the grooving knife so as to cut a groove in the surface of the welt strip when the welt strip is passed through the machine in either direction.

2. A machine for preparing welts having, in combination, means for supporting and guiding a welt strip, a grooving knife arranged to cut a groove in the surface of the welt strip, means for reversing the position of the grooving knife so as to cut a groove in the surface of the welt strip when it is passed through the machine in either direction, and a beveling knife arranged to bevel the edge of the welt strip when it is passed through the machine in either direction.

3. A machine for preparing welts having, in combination, means for supporting and guiding a welt strip including a work table and a presser-foot adapted to bear on top of the welt strip as it passes over the work table, a carrier for the presser-foot, a grooving knife arranged to cut a groove in the surface of the welt strip, a carrier for the knife journaled in the presser-foot carrier, and means for turning the knife carrier through an angle of 180° whereby the knife is adapted to cut a groove in the surface of the welt strip when the welt strip is passed through the machine in either direction.

4. A machine for preparing welts having, in combination, a work supporting table, a movable side gage adapted to bear against one edge of the welt strip, a spring tending to press the side gage toward the welt strip, a presser foot adapted to bear against the upper surface of the welt strip, a spring for holding the presser foot against the welt strip, and a common manually operable means for removing the side gage and presser foot relatively to the work table against the pressure of their springs to permit the insertion of a welt strip, said manually operable means upon its release by the operator acting to first release the side gage and permit it to return under the action of its spring to engage the welt strip and to thereafter release the presser foot and permit it to return under the action of its spring to engage the welt strip subsequently to its engagement by the side gage.

5. A machine for preparing welts having, in combination, a work table, a movable side gage adapted to bear against one edge of the welt strip, a spring tending to press the side gage toward the welt strip, an adjustable stop for limiting the movement of the side gage under the action of its spring, a presser foot adapted to bear against the upper surface of the welt strip, a spring for holding the presser foot against the welt strip, and a common manually operable means for removing the side gage and presser foot relatively to the work table against the pressure of their springs to permit the insertion of a welt strip, said manually operable means upon its release by the operator acting to first release the side gage and permit it to return under the action of its spring to engage the welt strip and thereafter to release the presser foot and permit it to return under the action of its spring to engage the welt strip subsequently to its engagement by the side gage.

6. A machine for preparing welts having, in combination, a work table, a side gage adapted to bear against one edge of the welt strip, a presser foot adapted to bear against the upper surface of the welt strip, and a common manually operable means for engaging and disengaging the side gage and presser foot and the welt strip acting to cause the side gage to engage the welt strip prior to the engagement of the welt strip by the presser foot.

7. A machine for preparing welts having, in combination, a work table, a side gage adapted to bear against one edge of a welt strip, a spring tending to press the side gage toward the welt strip, a presser foot adapted to bear against the upper surface of the welt strip, a spring for holding the presser foot against the welt strip, and manually operable means for removing the side gage and presser foot relatively to the work table against the pressure of their springs to permit the insertion of a welt strip comprising a cam for lifting the presser foot and a striker acting after the presser foot is raised to move the side gage arranged to allow the side gage to engage the welt strip prior to the engagement of the welt strip by the presser foot.

8. A machine for preparing welts having, in combination, means for supporting and guiding a welt strip including a work table and a presser foot adapted to bear on top of the welt strip as it passes over the work table, a carrier for the presser foot arranged to slide in the machine frame, a grooving knife arranged to cut a groove in the surface of the welt strip, a knife carrier journaled in the presser foot carrier and having a head with a transverse groove across its top, a handle for turning the knife carrier to reverse the position of the grooving knife, and a spring pressed member having a rib pressed into engagement with the groove in the knife carrier head whereby the knife carrier is held in its turned position and the presser foot and knife are held against the work.

9. A machine for preparing welts having, in combination, means for supporting and guiding a welt strip including a work table and a presser foot adapted to bear on top of the welt strip as it passes over the work table, a carrier for the presser foot arranged to slide in the machine frame, a grooving knife arranged to cut a groove in the surface of the welt strip, and means for supporting the knife on the presser foot carrier and for adjusting the knife laterally of the welt strip including a frame pivotally mounted on the presser foot carrier to turn about an axis located at one side of the knife edge and an adjusting screw for adjusting the frame about said axis.

10. A machine for preparing welts having, in combination, means for supporting and guiding a welt strip including a work table and a presser foot adapted to bear on top of the welt strip as it passes over the work table, a carrier for the presser foot arranged to slide in the machine frame, a grooving knife arranged to cut a groove in the surface of the welt, and means for supporting the knife on the presser foot carrier, for adjusting the knife laterally of the welt and for reversing the knife comprising a frame pivotally mounted in the presser foot carrier to turn about an axis located at one side of the knife edge, an adjusting screw for adjusting the frame about said axis whereby the knife may be moved laterally of the welt, a knife carrier journaled in said frame, and mechanism for turning said knife carrier through an angle of 180° and locking it in position, whereby the grooving knife is arranged to cut a groove in the welt strip when the welt strip is passed through the machine in either direction.

11. A machine for preparing welts having, in combination, means for supporting and guiding a welt strip including a work table, a laterally adjustable side gage adapted to bear against one edge of the welt strip, a presser foot, a laterally fixed side gage formed by a downwardly extending flange on the presser foot adapted to bear against the opposite edge of the welt strip, knives for cutting the welt as it passes over the work table, and means for feeding the welt to the knives.

12. A machine for preparing welts having, in combination, a work table, a presser foot, a spring for holding the presser foot against the welt strip, a side gage, a spring for holding the side gage against the edge of the welt strip, and manually operable means for raising the presser foot and moving the side gage away from the welt strip having lost motion in its connection to the side gage so that the presser foot is lifted before the side gage and the side gage is repositioned by its spring before the presser foot is brought against the welt when the manually operable means is released.

13. A machine for preparing welts, having, in combination means for guiding the welt strip as it travels forwardly past the grooving means during the normal operation of the machine, means acting on the guiding means for permitting the uncut forward end of the welt strip to be inserted in the machine and drawn backwardly past the grooving means, and grooving means for cutting a groove in the surface of the welt strip, not only when the welt strip travels forwardly during the normal operation of the machine, but also when its uncut forward end is drawn backwardly, so as to permit the entire length of the welt strip to be grooved by the machine.

14. A machine for preparing welts, having, in combination, means for guiding the welt strip as it travels forwardly past the beveling means during the normal operation of the machine, means acting on the guiding means for permitting the uncut forward end of the welt strip to be inserted in the machine and drawn backwardly past the beveling means, and beveling means for cutting a bevel on the edge of the welt strip, not only when the welt strip travels forwardly during the normal operation of the machine, but also when its uncut forward end is drawn backwardly, so as to permit the entire length of the welt strip to be beveled by the machine.

15. A machine for preparing welts, having, in combination, means for guiding the welt strip as it travels forwardly past the grooving and beveling means during the normal operation of the machine, means acting on the guiding means for permitting the uncut forward end of the welt strip to be inserted in the machine and drawn backwardly past the grooving and beveling means, and means for cutting a groove in the surface of the welt strip and for beveling the edge of the welt strip, not only when the welt strip travels forwardly during the normal operation of the machine, but also when its uncut forward end is drawn backwardly, so as to permit the entire length of the welt strip to be grooved and beveled by the machine.

16. A machine for preparing welts, having, in combination, means for guiding the welt strip as it travels forwardly past the grooving and beveling knives during the normal operation of the machine, manually operable means acting on the guiding means for permitting the uncut forward end of the welt strip to be inserted sidewise into the machine and drawn backwardly past the grooving and beveling knives, and grooving and beveling knives for cutting a groove in the surface of the welt strip and for cutting a bevel on the edge of the welt strip, not only when the welt strip travels forwardly during the normal operation of the machine, but also when its uncut forward end is drawn backwardly, so as to permit the entire length of the welt strip to be grooved and beveled by the machine.

17. A machine for preparing welts, having, in combination, means for supporting and guiding the welt strip as it travels forwardly past the grooving and beveling knives during the normal operation of the machine comprising a work table, a side gage and a presser foot, feeding mechanism for pulling the welt strip forwardly past the grooving and beveling knives, manually operable means for moving the side gage laterally and raising the presser foot, so as to permit the uncut forward end of the welt strip to be inserted sidewise in the machine and drawn backwardly past the grooving and beveling knives, and grooving and beveling knives for cutting a groove in the surface of the welt strip and cutting a bevel at the edge of the welt strip, not only when the welt strip travels forwardly during the normal operation of the machine, but also when its uncut forward end is drawn backwardly, so as to permit the entire length of the welt strip to be grooved and beveled by the machine.

18. A machine for preparing welts, having, in combination, means for guiding the welt strip as it travels forwardly past the beveling knife during the normal operation of the machine, means acting on the guiding means for permitting the uncut forward end of the welt strip to be inserted in the machine and drawn backwardly past the beveling knife, and a two-edged beveling knife for cutting a bevel on the edge of the welt strip, one edge of the knife cutting the strip when the welt strip travels forwardly during the normal operation of the machine, and the other edge of the knife cutting the welt strip when its uncut forward end is drawn backwardly, so as to permit the entire length of the welt strip to be beveled by the machine.

19. A machine for preparing welts, having, in combination, means for guiding the welt strip as it travels forwardly past the beveling knife during the normal operation of the machine, means acting on the guiding means for permitting the uncut forward end of the welt strip to be inserted in the machine and drawn backwardly past the beveling knife, and a triangular beveling knife having two oppositely directing cutting edges, one edge of the knife beveling the welt strip when the welt strip travels forwardly during the normal operation of the machine, and the other edge of the knife beveling the strip when its uncut forward end is drawn backwardly, so as to permit the entire length of the welt strip to be beveled by the machine, the triangular knife serving to deflect the chip cut thereby away from the welt strip.

THOMAS H. SEELY.

Witnesses:
CHESTER E. ROGERS,
LAURA M. GOODRIDGE.

Copies of this patent may be obtained for five cents each, by addressing the "Commissioner of Patents, Washington, D. C."